Nov. 9, 1943.    W. EISENSCHMID    2,333,994
PARKING METER
Filed April 7, 1941    7 Sheets-Sheet 1

INVENTOR
William Eisenschmid
By Green & McCallister
His Attorneys

Nov. 9, 1943.    W. EISENSCHMID    2,333,994
PARKING METER
Filed April 7, 1941    7 Sheets-Sheet 2

INVENTOR
William Eisenschmid
BY Green & McCallister
His Attorneys

Nov. 9, 1943.   W. EISENSCHMID   2,333,994
PARKING METER
Filed April 7, 1941   7 Sheets-Sheet 3

Nov. 9, 1943.  W. EISENSCHMID  2,333,994

PARKING METER

Filed April 7, 1941  7 Sheets-Sheet 4

INVENTOR

William Eisenschmid
By Green & McCallister
His Attorneys

Nov. 9, 1943.     W. EISENSCHMID     2,333,994
PARKING METER
Filed April 7, 1941     7 Sheets-Sheet 5

INVENTOR
William Eisenschmid
By
Erien & McCallister
His Attorneys

Nov. 9, 1943.    W. EISENSCHMID    2,333,994
PARKING METER
Filed April 7, 1941    7 Sheets-Sheet 6

INVENTOR
William Eisenschmid
By Green & McCallister
His Attorneys

Nov. 9, 1943.   W. EISENSCHMID   2,333,994
PARKING METER
Filed April 7, 1941   7 Sheets-Sheet 7

INVENTOR
William Eisenschmid
By Green & McCallister
His Attorneys

Patented Nov. 9, 1943

2,333,994

UNITED STATES PATENT OFFICE 2,333,994

PARKING METER

William Eisenschmid, Pittsburgh, Pa., assignor to Pittsburgh Taximeter Company, a corporation of Pennsylvania Application April 7, 1941, Serial No. 387,201

15 Claims. (Cl. 194—1)

This invention relates to what are commonly known as parking meters.

One object of this invention is to produce a parking meter employing a signal carried by an arm, by which the meter is operated and which when the meter is not in operation and also as soon as the paid for parking time expires, displays said signal conspicuously above the meter where it can be seen from all directions. When parking time has been paid for and the meter is operating, this signal occupies an inconspicuous position below the top of the meter.

A further object of this invention is to produce a parking meter in which the coin slot is normally closed and is only opened by a full downward movement of the signal carrying arm and is again immediately closed after a coin is deposited.

Another object of this invention is to produce a parking meter in which the downward movement of the signal carrying arm not only opens the coin slot but stresses or "winds" the spring of the clock mechanism of the meter.

A still further object of this invention is to produce a parking meter employing a signal or flag which is conspicuously displayed above the meter when the meter is not operating, which employs a coin slot that is normally closed and which makes use of movement of the signal or flag carrying arm to open the coin slot and to stress or wind the spring of the meter clock mechanism.

Another object of this invention is to produce a parking meter in which the coin slot is normally closed and is opened by movement of the arm which stresses or winds the spring of the clock mechanism and in which a shutter is employed for closing the coin slot as soon as a coin is deposited.

A still further object of this invention is to produce a parking meter having a pivotally mounted signal arm and in which it is necessary to manually operate said signal arm to open the coin slot for each coin to be deposited.

These and other objects, which will be apparent to those skilled in this particular art, I attain by means of the device described in the specification and illustrated in the drawings accompanying and forming part of this application.

Before describing the drawings, it is believed advisable to set forth in a general way the operation of the parking meter of this invention.

The parking meter employs a signal or flag which when the meter is not in operation as well as when the parking privilege is being violated, is conspicuously displayed above the meter housing where it can be readily seen from a distance and from all directions. This signal is carried at the outer or free end or an arm which is operatively connected to the main horizontal shaft of the meter mechanism.

The coin slot is normally closed and is opened to receive a coin by turning the signal arm counter-clockwise through approximately 180 degrees.

When the signal arm is released after a coin is deposited, it swings up to horizontal position below the top of the meter where it remains until the paid for time has expired. Immediately upon expiration of the time paid for, this arm swings up to vertical position displaying the signal above the meter housing in violation position. The clock mechanism continues operating after expiration of the paid-for parking period, carrying with it the hand or pointer which indicates the parking time period paid for. This overtime movement of the indicator hand continues for a period of about 15 minutes or more, in order to assist the officer having charge of the parking meters in checking violations of the parking privilege.

Manual movement of the signal arm to open the coin slot stresses the spring of the clock mechanism. In the meter chosen for illustration, maximum parking time is one hour. This can be paid for by a five cent piece or by five pennies.

If a five cent piece is deposited, the time paid for hand or indicator immediately moves to the position indicating 60 minutes. If it is desired to deposit two or more pennies, this may be done if, after each penny is deposited, the signal arm, after moving to its horizontal position is again moved counter-clockwise from its horizontal position to the limit of its downward movement. This movement from horizontal position causes the coin slot to be opened.

After each penny is deposited, the coin slot is immediately closed. For each penny deposited in this manner, the time paid for indicator moves to a position corresponding to the time paid for. In other words, upon depositing the first penny, the hand or indicator moves to the position indicating twelve minutes paid for. Upon depositing the second penny, the hand moves to the position indicating 24 minutes paid for, etc.

Any number of 12 minute periods, up to five of course, can be purchased by depositing one penny for each 12 minute period, provided the coin slot has first been opened by swinging the signal arm from its horizontal position to the limit of its downward movement.

In the drawings:

When the meter is operating and the parking time has not expired, the signal arm stands in the horizontal position as shown by dotted lines.

Fig. 9 is a sectional view in elevation of parts of the meter mechanism. This view illustrates the train of gears for stressing the clock spring, the cam for restoring the timing cam shaft actuator to normal position and shows the inner coin slot guard in open position. This view is taken with the signal arm in violation position.

Fig. 11 is a sectional view in elevation of parts of the meter mechanism. In this view, the coin runway front cover plates is in place, the timing indicator hand is shown in violation position, the signal is in violation position, the outer coin slot gate is closed and the parts are in normal position with the meter at rest.

Fig. 11a is a view of the cam operated release mechanism and particularly the penny operated portion as it is before a deposited coin has operated the same.

Fig. 12 is a view similar to Fig. 11 with the front cover of the coin passage removed. The signal arm has been moved counter-clockwise to the lower limit of its travel, a penny has been deposited and has moved past the position at which it operates the mechanism for releasing the timing cam shaft actuator. The timing cam shaft has moved to the 12 minute parking time position as indicated by the parking time pointer or hand.

The parking meter includes a clock mechanism and a windgate, but only so much of each of these has been illustrated in the drawings as is necessary for a complete understanding of the operation of the other instrumentalities.

The meter mechanism is housed within a case 40 which is mounted in position on a standard 41. The case is provided with a removable cover 42 and has a window 43 through which the parking time indicator is visible. The front wall of the case is also provided with a magnifying coin window 44 such as is now common.

The top portions of the walls of the case are reduced in thickness to receive the cover which is supported on the ledge 42', formed by this reduction in thickness of the top of the wall.

Figures 1, 28, 29, 30, 31:
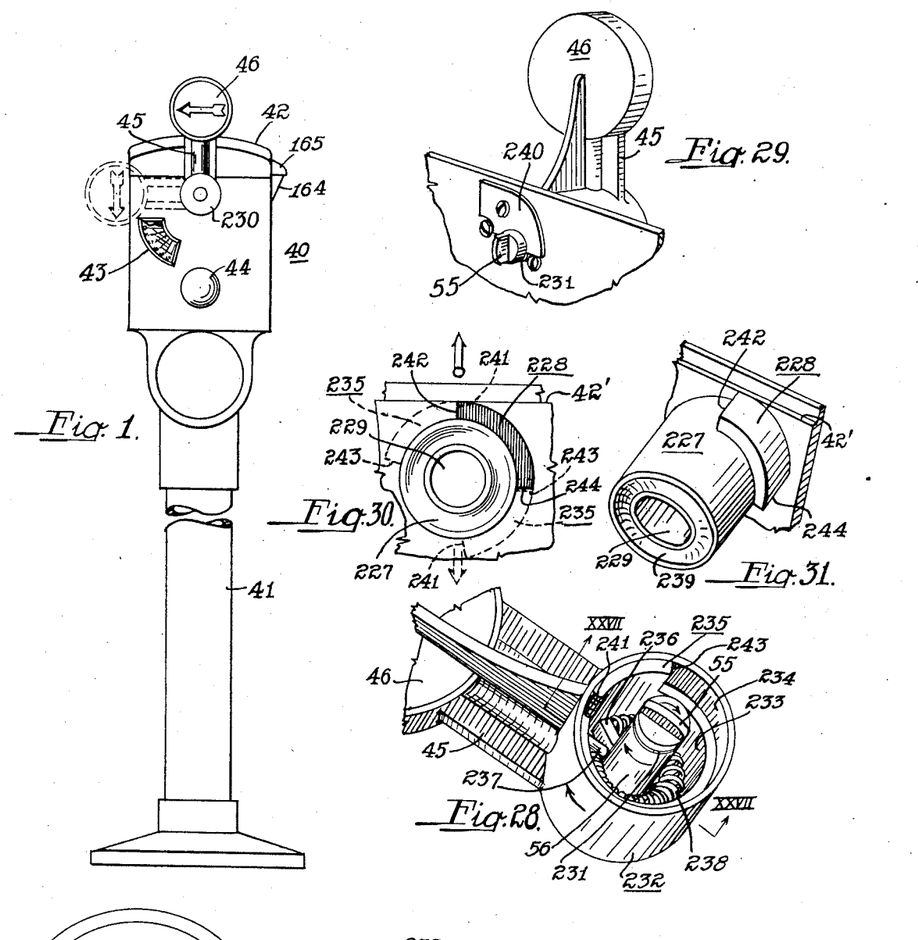
Figure 1 is a front elevational view of a parking meter embodying this invention and mounted upon its supporting standard. The arm carrying the signal at its outer or free end is shown in violating position, the position it occupies at all times except when parking time has been paid for and has not expired.
Figs. 27–31 inclusive are detail views of the means for operatively connecting the signal arm to the main shaft of the meter.

A manually operable arm 45, which at its outer end carries the signal 46, is operatively connected to the main shaft of the meter. Normally, or when the meter is not in operation, as well as during violation of the parking privilege, signal 46 occupies a position above the meter case or housing as shown in Fig. 1. During the operation of the meter, on paid for parking time, the signal arm stands in a horizontal position with the signal below the top of the case or housing as indicated by dotted lines in Fig. 1.

The different instrumentalities entering into the make-up of the meter mechanism are carried by or mounted within bearings formed in a number of vertically extending plate-like members 47, 48, 49, 50 and 51, which, in turn, are mounted on a base plate 52.

Main shaft

The main shaft 53 has its forward end slotted as shown at 54 to receive the tongue 55 of a stub shaft 56 which forms part of the signal arm assembly, as illustrated in Figs. 27-31 inclusive and which will be later described.

The main shaft carries a gear 57 for operating the windgate (not shown) and a cam 58, which, in cooperation with a lever 59 (Figs. 18-21 inclusive) and a timing cam 60 locks the main shaft and holds the signal arm in horizontal position during the period that parking time is paid for.

A pinion 61, carried by the main shaft, meshes with a gear segment 62. A spring 63 secured to said gear segment (Figs. 4 and 5) causes the main shaft to rotate in a clockwise direction.

The main shaft also carries a cam 64 by means of which the actuator, which as an entirety is numbered 65 (Figs. 4 and 5) is moved to and held in position, against the stress of a spring 66 (Figs. 4, 5, 9 and 10) to be ready to operate as soon as a coin is deposited.

Figures 6, 8:
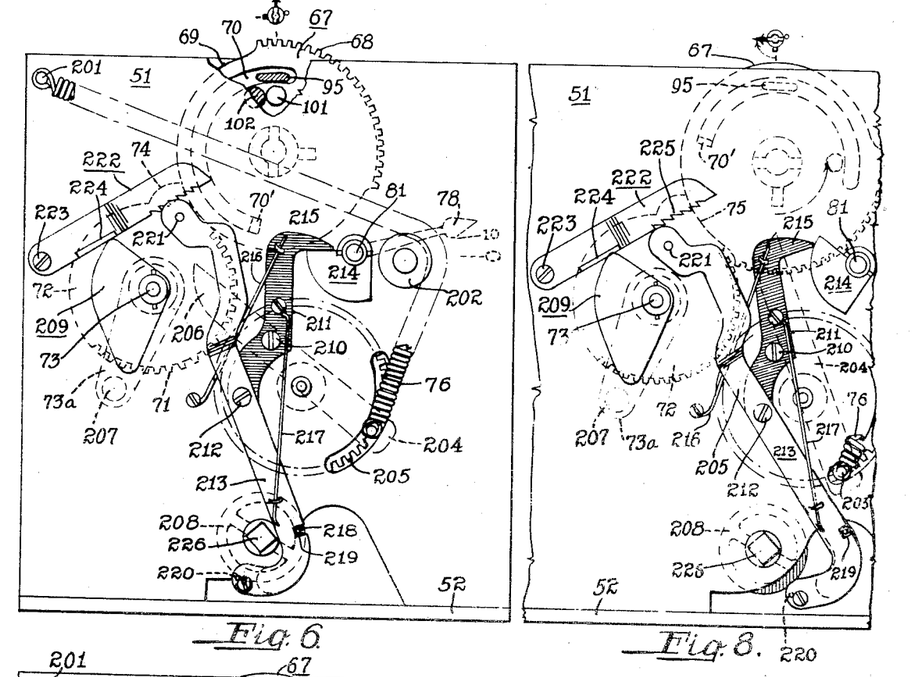
Figs. 6, 7 and 8 are elevational views looking at the back of the meter mechanism. These views illustrate the clock spring and the mechanisms for starting and stopping the clock mechanism of the meter.
Figure 7:
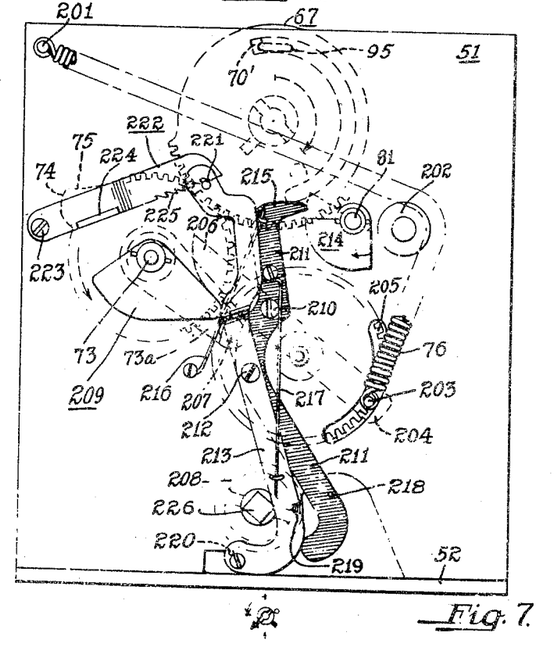
Figure 9:
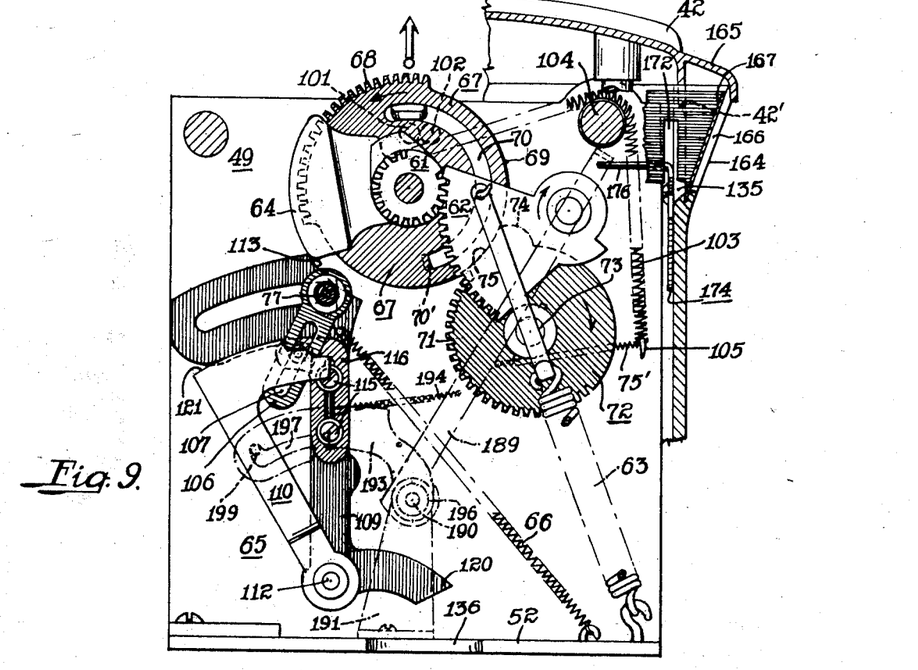
Figure 10:
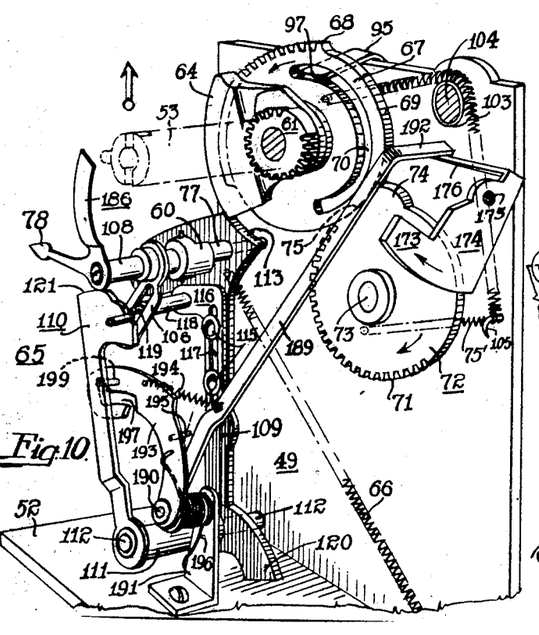
Fig. 10 is a fragmentary perspective view illustrating parts of the mechanism of Fig. 9 and shows the time indicating arm in the position it occupies during violation (see Fig. 11). In this view, the inner coin slot guard is shown in open position.

A mutilated gear 67, having a toothed portion 68, a smooth cylindrical portion 69, and an arcuate slot 70, is also carried by main shaft 53. The toothed portion 68 is adapted to mesh with the toothed portion 71 of a mutilated gear 72 secured to a shaft 73. Gear 72 is also provided with a toothed portion and with a smooth cylindrical portion having an outward bulge 74 which is provided with a concave surface 75. This concave surface, by means of a spring 75' is held in contact with the smooth cylindrical portion 69 of gear 67, ready to engage and be rotated by gear 67 upon rotation of the main shaft 53 during counter-clockwise movement of the signal arm from about horizontal position to the limit of its downward movement. Shaft 73 upon which gear 72 is mounted has a lever arm 73a attached to its outer end (Figs. 6-8 inclusive). This lever arm stresses or winds the clock spring 76 as will be hereinafter described.

Timing cam and clutch for connecting its shaft to clock mechanism

Timing cam 60 is secured to a shaft 77, which, at one end has rigidly attached thereto the time paid for pointer or indicator hand which is numbered 78. Shaft 77 at its end opposite hand or pointer 78 has attached thereto, by means of a pin 79, the socket-like end 80 of a stub shaft 81. This stub shaft has rigidly attached to it a cylindrical disk 82 which forms one member of a clutch device for connecting the timing shaft 77 to the clock mechanism, not shown in its entirety.

A gear 83 mounted for rotation on socket-like end 80 of stub shaft 81 forms the connecting gear between the clock mechanism and timing shaft 77. Gear 83 is provided with a laterally extending flange-like portion 84 which surrounds disk 82 and forms part of said clutch. Portion 84 is provided with a series of three pockets 85, each having the major portion of its outer wall concentric with disk 82, but which at its ends, as shown at 86, is flat and inclined toward disk 82. In other words, each of these pockets decreases in depth adjacent its ends because of these flat wall portions.

Two balls 87 are located within each of said pockets, and these are normally yieldingly spread apart and held within the reduced pocket ends by means of a coil spring 88.

It will be apparent that each pocket with its pair of balls and spring resembles two overrunning clutches. One clutch bucks the other and thus frictionally locks disk 82 to portion 84 of gear 83, or in other words, locks gear 83 of the clock mechanism to timing shaft 77.

Balls 87 and the coil spring 88 are held in place within pockets 85 by a cover plate 89. This cover plate is provided with a series of six concentrically arranged holes for the loose reception of six pins 90. These pins are carried by a disk-like member 91 having a hub portion 92 which is loosely mounted on stub shaft 81.

The outer ends of pins 90 are beveled as shown at 93 (Figs. 25 and 26) and the pins are arranged so as to be capable of being forced between balls 87 and the end faces 94 of the pockets 85, as member 91 is forced toward cover plate 89. It will be apparent that when pins 90 force balls 87 out of frictional engagement with the periphery of disk 82 and the flat reduced end portions of pockets 85, and against the stress of their springs, the clock mechanism will be uncoupled from timing shaft 77.

Lever 95, mounted on a pin 96, has one end 97 rounded (see Figs. 4 and 5) and its other end 98 bifurcated so as to straddle the hub 99 of the disk 91 which carries the series of clutch-ball-engaging pins 90. A spring 100 normally holds disk 91 in the position shown in Figs. 22 and 24 with curved end 97 of lever 95 projecting into arcuate slot 70 of gear 67 (Fig. 5).

While the clock mechanism is operating, as well as when the signal is in its position above the meter, denoting violation of the parking privilege, said rounded end 97 is located within arcuate slot 70 and therefore the clock mechanism is locked to timing shaft 77.

Figures 4, 18, 19, 20, 21:
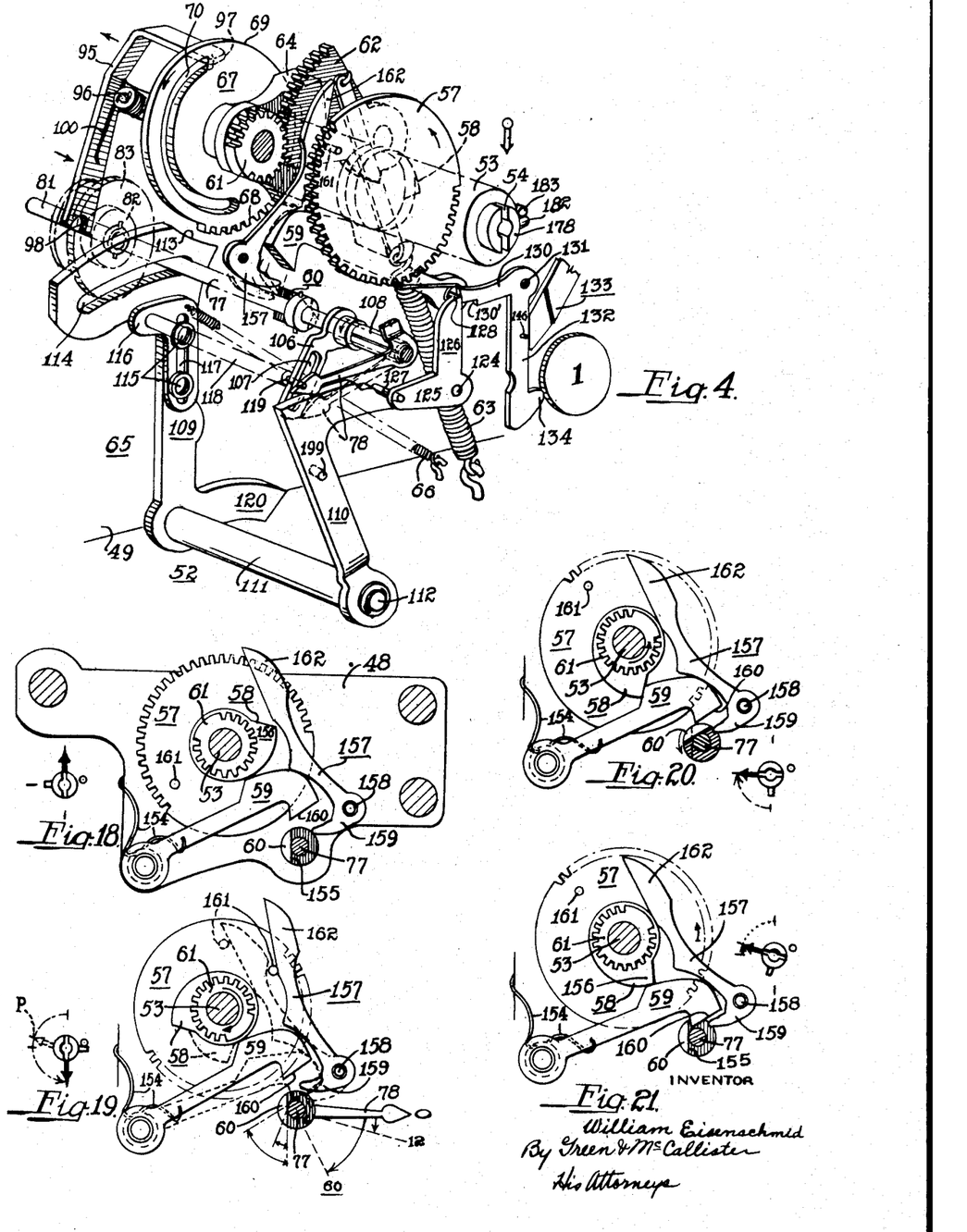
Fig. 4 is a perspective view of the signal arm operated main shaft with its gears, pinions and cams, the timing cam shaft with its timing cam, its setting arm, and the clutch part carried by the timing cam shaft and which connects the same to the clock mechanism. The shafts have been elongated between gears and levers for clearness. This view illustrates the mechanism for operating the clutch. This view also illustrates the different elements as they appear when the signal arm has been moved to the bottom of its travel.
Figs. 18, 19, 20 and 21 are rear elevational views of the timing cam, its shaft and the cams and levers which hold the signal arm in horizontal position during operation of the meter and which release the signal arm upon expiration of the parking period and permit it to be moved to violation position above the top of the meter housing. Associated with each of Figs. 18–21 inclusive is a diagram indicating from the front of the meter the direction and amplitude of movement of the main shaft during operation of the meter mechanism.
Figures 5, 17, 22, 23, 24, 25, 26:
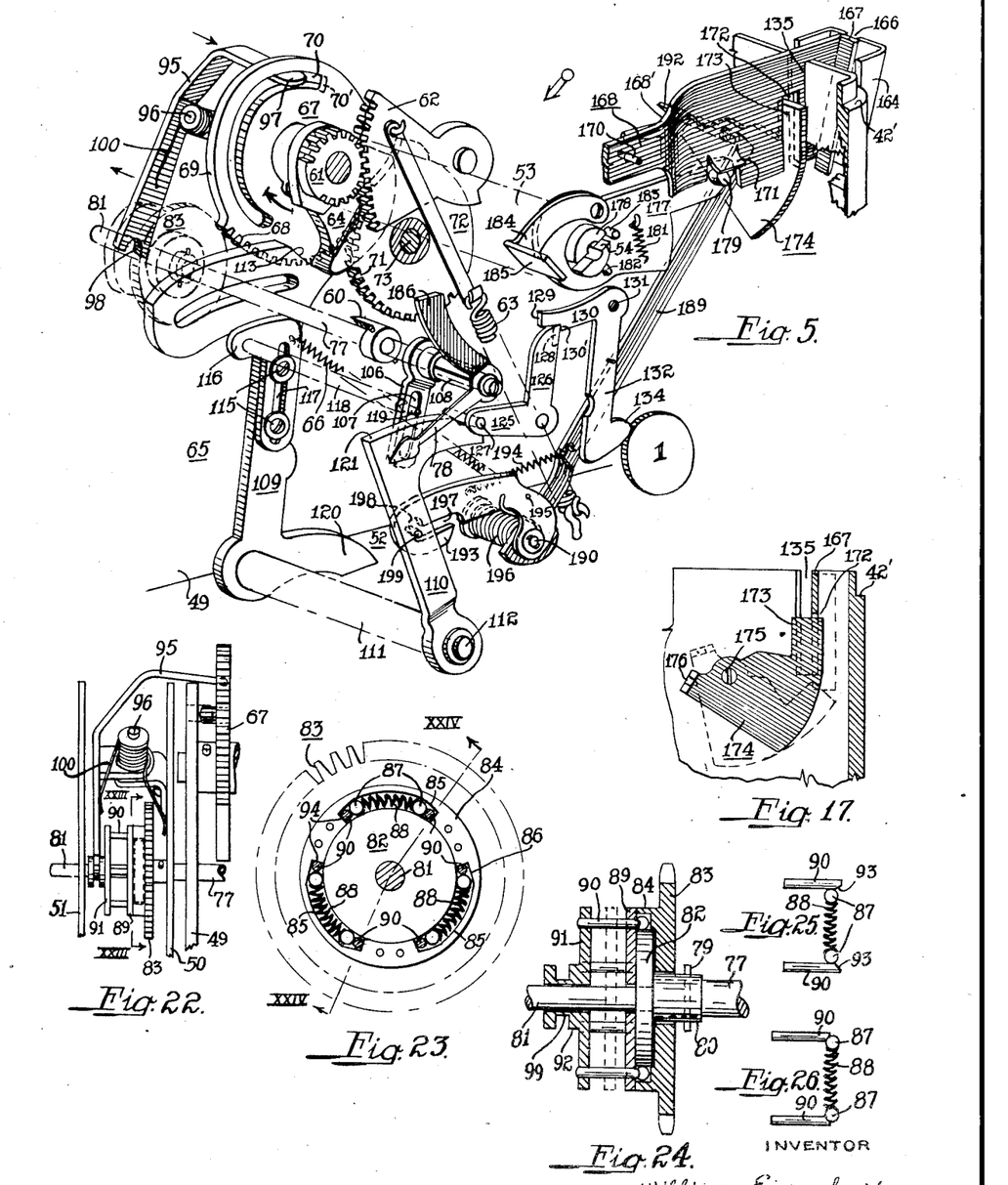
Fig. 5 is a view similar to Fig. 4, but includes the mechanisms for operating the outer coin slot gate and the inner coin slot guard. In this view, the signal arm has been moved to its lowermost position, a penny has been deposited and the signal arm has moved back to the position indicated by the arrow above the figure. The inner coin slot guard is shown closed and the timing cam shaft is connected to the clock mechanism by the clutch.
Fig. 17 is a fragmentary view illustrating the inner coin slot guard. This view shows by full lines the closed position of this guard and the open position by dotted lines.
Fig. 22 is a fragmentary detail view illustrating the clutch and its operating mechanism for connecting the timing shaft to and disconnecting it from the clock mechanism. In this view the clutch is disconnected.
Fig. 23 is an enlarged view taken on line XXIII—XXIII of Fig. 22.
Fig. 24 is a sectional view taken on line XXIV—XXIV of Fig. 23.
Figs. 25 and 26 are more or less diagrammatic views of parts of the clutch.

During manual counter-clockwise movement of the signal arm, and just prior to the time, during such movement, that said arm reaches the lower limit of its travel, rounded end 97 rides up the cam face 70' and out of slot 70 and bears against the back face of gear 67 as shown in Fig. 4. This movement of lever 95 causes gear 83 of the clock mechanism to be disconnected from the timing cam shaft 77.

Gear 67 carries a stop pin 101 and this contacts with a stop pin 102 which projects from plate 49 to limit the rotation of gear 67 and the main shaft in a clockwise direction under the influence of a spring 103. This spring passes over a pulley 104 and has one end secured to gear 67 and its other end secured to an anchor pin 105.

Timing cam shaft 77, between timing cam 60 and hand or pointer 78, is provided with a lever 106 having a slot 107 and a longitudinally split hub portion 108 which forms a friction connection between said shaft and said lever 106. The construction of the split hub is such that shaft 77 can be rotated by a quick movement of lever 106 when said shaft is disconnected from gear 83 and can be rotated slowly by said gear within hub 108 during operation of the clock mechanism.

Actuator 65

Actuator 65 is moved in one direction by cam 64 and in the opposite direction (when free of said cam) by a spring 66. The actuator comprises two levers 109 and 110 which are rigidly secured to a tubular connector 111. This tubular connector is mounted for rotation upon a shaft 112 secured to and projecting forwardly from support plate 49.

Lever 109 at its upper end is provided with a cam face 113 with which cam 64 engages during its clockwise movement when the signal arm moves from its horizontal to its vertical position, in which position the signal is displayed above the meter in violation position. This movement occurs at expiration of the paid for parking period. Cam 64 moves the actuator in opposition to spring 66 and sets it in position to operate upon deposition of a coin within the coin slot.

Lever arm 109 is slotted as shown at 114 to accommodate shaft 77 of the timing cam, which shaft passes through said slot as shown in Figs. 4 and 5.

Lever 109 has secured to it by means of screws 115 a bracket member 116 having an elongated slot 117 through which said screws pass and by means of which the bracket is locked in position on lever 109. Bracket member 116 has a rod 118 extending forwardly therefrom with its free end 119 projecting into slot 107 of lever arm 106. It is by means of this rod that the actuator rotates the timing cam to starting position upon deposition of a coin, at which time gear 83 of the clock mechanism is disconnected from the timing cam shaft 77.

Bracket member 116 is made adjustable lengthwise of lever arm 109 for the purpose of obtaining proper movement of lever arm 106 and therefore the timing cam 60 and time indicator hand 78 during movement of the timing cam shaft when disconnected from gear 83.

Lever arm 109 is provided with a laterally projecting portion or foot 120, which is adapted to contact with base plate 52 and thus limit the movement of actuator 65 in a clockwise direction or toward main shaft 53 when a five cent piece or nickel is deposited, as will be later explained.

Figures 2, 13, 14, 15:
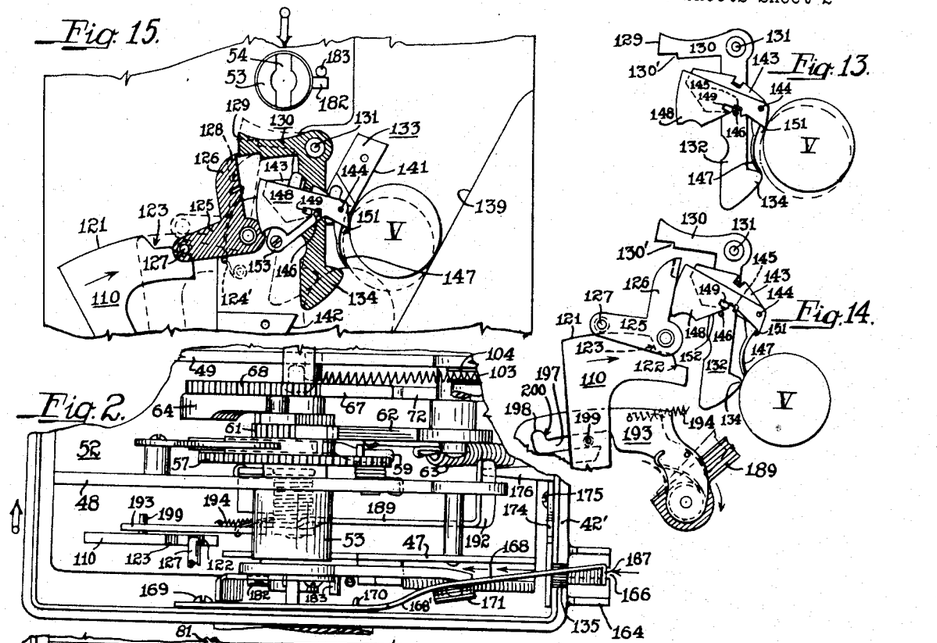
Fig. 2 is a partial top plan view of the meter with the top of the meter housing removed. In this view, the coin slot is closed by the outer gate and the inner guard is open. This assumes that the signal arm is in vertical position with the signal displayed above the meter.
Fig. 13 illustrates that part of the release mechanism which is operated by a nickel or five cent piece, and shows the parts in the poistions they occupy before release.
Fig. 14 is a view embracing the parts shown in Fig. 13 and in addition part of the inner coin slot guard operating mechanism and shows the parts as they appear after the release mechanism has been moved to release position by the nickel or five cent piece.
Fig. 15 is a view similar to Figs. 13 and 14, but illustrates by full and dotted lines the operation of the release mechanism when a five cent piece or nickel is deposited.

Lever arm 110 of the actuator is provided with an upper arcuate surface 121 and the outer end of said lever or arm forwardly of said surface is provided with two notches 122 (Fig. 14) and 123 (Fig. 15).

A latch member pivotally mounted on a pin 124 secured to support plate 47 is provided with two arms 125 and 126. Arm 125 carries a pin 127 which normally, or while the meter is at rest, is positioned within notch 122 of arm 110 of the actuator.

Arm 126 of the latch member has a laterally projecting upper end 128 which contacts with the outer end 129 of the upper arm 130 of a release lever which is pivotally mounted on a pin 131 which is also secured to support plate 47. The lower arm 132 of this release lever normally rests against a stop 133. The construction and arrangement of the latch, the release lever, stop 133 and pin 127, with relation to notch 122 of lever 110 is such that actuator 65 is held or locked in the position shown in Fig. 4 and against the stress of its actuating spring 66 while the meter is idle and until a deposited coin moves the release lever away from stop 133, as will be later described.

Figure 11:
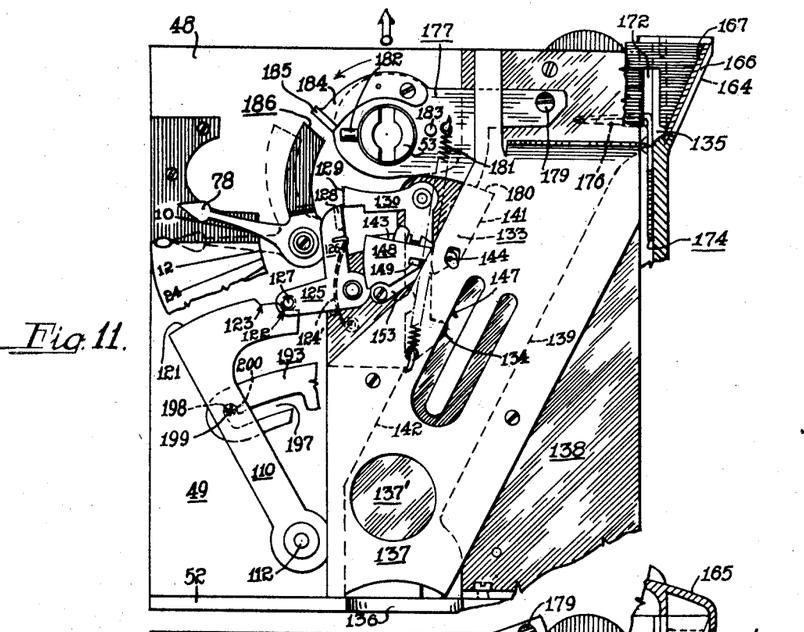
Figures 11A, 12:
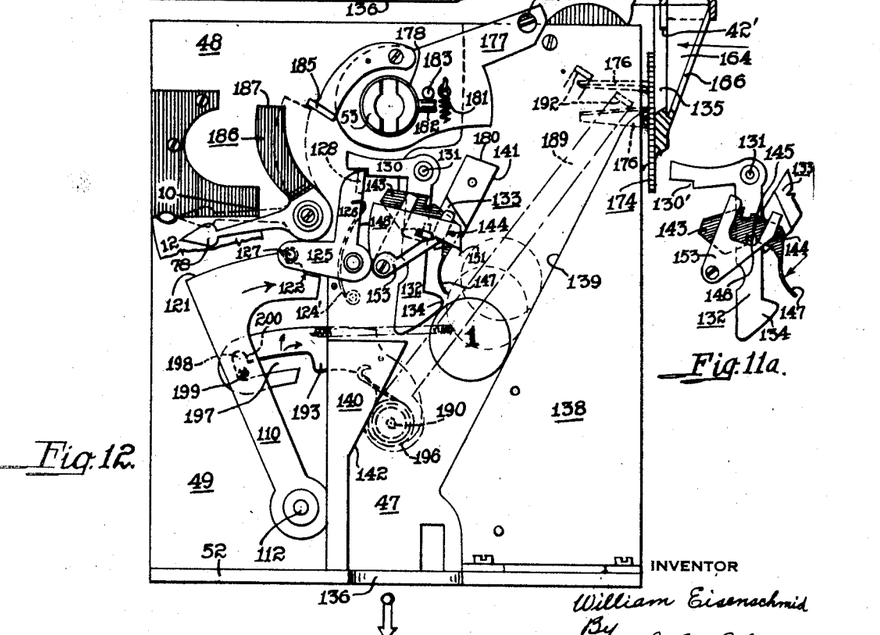

The coins in their travel along the coin runway contact with the laterally projecting end 134 of the release lever which projects into said runway as shown in Figs. 11 and 12.

In Fig. 11, cover plate 137 is shown in place, while in Fig. 12, the cover is removed.

Since the movement of the time indicating hand or pointer 78 is dependent upon the amplitude of movement of the actuator in a clockwise direction, this is governed by the value of the coin deposited within the coin slot. If a nickel or five-cent piece is deposited, the timing cam is moved to such position that the indicator hand 78 attached to the timing cam shaft indicates a sixty-minute paid for parking period. If but a penny is deposited, the timing cam is moved to such position that said indicator hand indicates a 12-minute paid for parking period. If a second penny is deposited after the coin slot has been opened by proper movement of the indicator arm, the timing cam will be moved to a starting position corresponding to a 24-minute parking period. In other words, for each penny or one cent piece deposited, after proper movement of the indicator arm to open the coin slot, the timing cam will be rotated a distance corresponding to a 12-minute period, up to five such periods. Indicator hand 78, of course, will also be advanced accordingly.

The movement of the actuator occasioned by its spring 66 depends upon the position of the latch member, and the movement of the latch member in turn is dependent upon the movement of arm 132 of the release lever away from stop 133.

Since the release lever is made in the form of a bell crank, as its arm 132 moves away from stop 133, its upper arm 130 swings upward. The underside of this arm adjacent its outer end is provided with a notch 130', and, as the release lever moves a sufficient distance to release the latch from notch 130', the actuator, under the urge of its spring 66, swings the latch so that with nickel operating, pin 127 rides along arcuate surface 121 of its arm 110; the actuator when thus completely released moves until its foot 120 contacts with base plate 52. Pin 127, which projects laterally from the outer end of arm 125 of the latch, is yieldingly held in contact with the upper surface (notch 122, notch 123 or arcuate surface 121) of lever arm 110 of the actuator by means of a spring 124'.

Coin runway

The coin runway extends from coin slot 135 past the magnifying window 44 to a slot 136 in bottom plate 52. The back or rear face of the runway is formed by support plate 47 while its forward face is formed by a cover plate 137 which is provided with a coin window 137' in alignment with magnifying window 44. A plate 138 located between support plate 47 and cover plate 137 has its edge 139 straight and inclined from coin slot 135 to a point adjacent the bottom of the coin runway. Coins moving from the coin slot along the coin runway roll or slide in contact with edge 139 of this plate which in effect forms the bottom surface of the runway. Plate 138, stop 133 and a plate 140 form supports for cover plate 137 and space said plate away from plate 47 a sufficient distance to allow the coins to move freely along the runway.

Edge 141 of stop 133 and edge 142 of plate 140 are in line and form the opposite side of the coin runway from edge 139 of plate 138.

When arm 132 of the release lever is in contact with stop 133 (Figs. 11, 11a, and 15) the distance between the outer end of its projection 134, which extends into the runway (Figs. 11, 12 and 15), and that portion of the wall or floor 139 immediately opposite the same is less than the diameter of a penny or one cent piece (and therefore less than the diameter of a nickel or five cent piece), so that it is necessary for such coin, in order to pass down the runway, to move the release lever away from stop 133.

*Mechanism for locking the release lever against movement and limiting its movement in accordance with the value of the coin deposited*

The release lever is normally locked in position against stop 133, and the mechanism for so locking the same and for controlling the amplitude of its movement away from said stop is illustrated in more or less detail in Figs. 11a, 12, 12a, 13, 14 and 15.

A coin operated latch member 143 locks the release lever against movement. This latch member is mounted for pivotal movement about a pin 144 which projects forwardly from stop 133 toward cover plate 137. The major portion of this coin operated latch member 143 projects to the left of pivot pin 144, or toward arm 126, and has a notch 145 in its lower edge which normally engages a pin 146 which projects laterally from arm 132 of the release lever. Since the movement of latch 143, due to gravity, is in a counter-clockwise direction, notch 145, by engaging pin 146, normally locks the release lever in the position shown in Figs. 4 and 15.

Latch member 143 is provided with a coin contact arm 147 which projects into the coin slot to a position nearer the bottom or wall 139 of said slot than the extreme outer end of projection 134 of the release lever, and therefore a coin moving down the coin runway and contacting with said arm, raises latch member 143 about pivot pin 144 so that its notch 145 is disengaged from pin 146. This allows the release lever to be moved away from stop 133.

In order to limit this movement of the release lever when a penny or one cent piece is deposited so that actuator 65 can only move timing cam 60 a distance corresponding to a 12 minute period. a second latch member 148 is employed. This latch member is also pivotally mounted on pivot pin 144, and, adjacent its underside, this second latch member is provided with a longitudinally extending hole 149. At one end, this hole has a mouth or opening 150. When this second latch member is in normal position, the position it assumes due to gravity, pin 146 occupies the position shown in Fig. 12a, viz., in the end of hole 149 remote from its mouth 150. Latch 148 at its end adjacent pivot pin 144 is provided with a coin contact arm 151 (this may be termed the five cent or nickel contact arm) and the outer end of this arm, when latch member 148 is in normal position, (Figs. 11, 12, 12a and 15) is located a distance away from the nearest point in floor or wall 139 of the coin slot which is slightly greater than the diameter of a penny or one cent piece, and less than the diameter of a nickel or five cent piece. A penny, therefore, in sliding or rolling down floor 139 of the coin slot, will miss coin contact arm 151, while a five cent piece or nickel will contact with the same and swing latch member 148 about its pivot pin 144 (Figs. 13 and 14). This upward swinging movement of latch member 148 causes it to free pin 146. In other words, in the upward swinging movement of latch member 148 about its pivot pin 144, pin 146 projecting from arm 132 of the release lever in effect moves out of mouth 150 of hole 149 and rides along the underside 152 of latch 148, (Fig. 14).

Figure 12A:
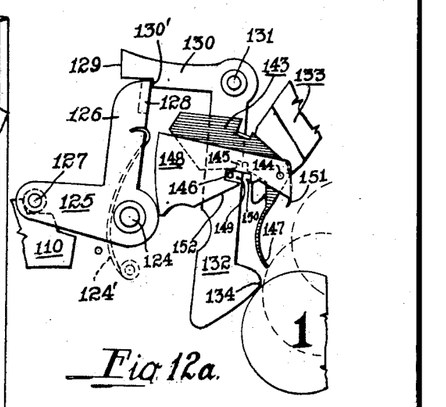
Fig. 12a is an enlarged view of the release mechanism shown in Fig. 12 and illustrates the parts in the same position as in Fig. 12.

For the purpose of clarifying Figs. 12a, 13 and 14, the V-shaped element 153 which separates coin operated latch members 143 and 148 has been omitted.

The operation of latch member 143 when a penny or one cent piece is deposited is graphically illustrated in Figs. 11, 11a, 12 and 12a and the operation of latch members 143 and 148 when a five cent piece or nickel is deposited is graphically illustrated in Figs. 13, 14 and 15.

When a penny or one cent piece is deposited, the release lever is moved to and locked in the position shown in Figs. 5, 12 and 12a, thus limiting the movement of actuator 65 and the movement of the timing cam a distance corresponding to a twelve minute parking period. When a nickel or five cent piece is deposited, the release lever is unlocked from both latch members 143 and 148 (Fig. 14) and is free to swing to a position such as will permit actuator 65 to move, until its foot 120 contacts with base plate 52. Such movement will cause the timing cam to move to a position corresponding to a sixty minute parking period.

*Means locking signal arm in horizontal position during parking time period*

Fig. 18 which is a rear view, shows timing cam 60 in the position it occupies at the end of a parking period. In this view, the signal as shown in the diagram accompanying the same is in violation position above the meter. When in this position, gear 57 and cam 58 are in the positions indicated, and lever 59 is held out of contact with the timing cam by a spring 154.

When the signal has reached the lower limit of its travel, gear 57 has moved to the position shown in Fig. 19, and cam 58 and lever 59 have moved to the full line positions shown by said figure. Upon depositing a coin, the timing cam is moved to the starting position corresponding to the value of the coin deposited. Fig. 20 shows the timing cam in position for a sixty minute parking period.

When a nickel is deposited or when five pennies are deposited, after proper manipulation of the signal arm, the signal has returned from the lower limit of its travel to its horizontal position, gear 57, cam 58 and lever 59 occupy the positions shown in Fig. 20.

Upon expiration of the parking time period, the back face 155 of the timing cam stands in vertical position as shown in Figs. 18 and 21, which permits lobe 156 of cam 58 to force the end of lever 59 down out of its way as shown in Fig. 21, thereby releasing the main shaft 53 and allowing spring 63, in cooperation with gear segment 62, to rotate the main shaft in a clockwise direction until stop pin 101 contacts with stop pin 102 and when this occurs, the signal arm will stand in vertical position.

It has been found that lever 59 at times has a tendency to stick in the position indicated in Fig. 21, and, in order to insure its release, a lever 157 is provided for that purpose. This lever, which is formed in the nature of a bell crank and is pivotally mounted on pin 158, has its lower arm 159 positioned below cam contact face 160 of lever 59. Gear 57 carries a pin 161 which projects outwardly from one side face thereof for contacting with the upper arm 162 of lever 157.

During movement of the signal arm from its position above the meter to the lower limit of its travel, and at the time the arm carrying said signal reaches the position P in the diagram accompanying Fig. 19 (at this time cam 58, contact pin 161, and levers 59 and 157 are in the positions indicated by dotted lines in Fig. 19) pin 161 collides with the upper arm 162 of lever 157, and, during further movement of the signal from position P to the limit of its downward movement, lever 157, if lever 59 is stuck as above referred to, lifts the outer end of lever 59 out of contact with the back face 155 of the timing cam and permits spring 154 to raise lever 59 into contact with cam 58.

When a penny or one cent piece is deposited, the timing cam rotates approximately 20° and when a nickel or five cent piece is deposited, said cam rotates approximately 60°. This is graphically shown in Fig. 19.

*Coin slot, gate and guard*

Coin slot 135 formed in one side wall of the case, is protected by a portion 164 which, extending outwardly on both sides thereof, is covered by a roof member 165 formed as part of the removable cover 42 of the case. Portion 164 in line with coin slot 135 (Figs. 2, 3, 5 and 12), is provided with a coin slot 166. Portion 164 and roof member 165 in effect form a vestibule for connecting coin slots 135 and 166. The outer wall of the vestibule in which slot 166 is located slants inwardly from said roof to the side of the case, as shown in Figs. 1, 5, 9 and 11.

Figure 3:
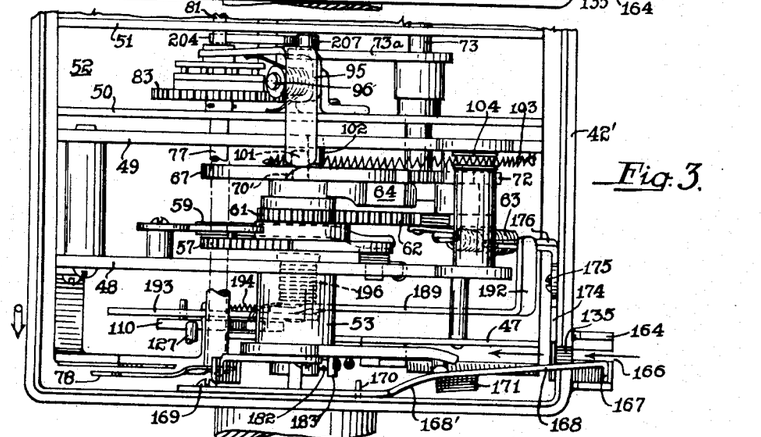
Fig. 3 is a view similar to Fig. 2, but embraces more of the meter mechanism and in this view the outer coin gate is open and the inner coin slot guard or shutter is closed; closing of the inner coin slot guard occurs immediately after a coin is deposited. The inner guard remains in this position until the signal arm moves up to horizontal position; the position it occupies during operation of the meter and until parking time expires. In this view, the signal arm has been moved down to the bottom of its travel and a nickel has been deposited.

Coin gate 167 is formed as part of a member 168 which is preferably formed of spring metal. At its end opposite coin gate 167, member 168 is secured against the inner face of the front wall of the case, by means of a screw 169 (Figs. 2 and 3). A support pin 170 projecting rearwardly from said front wall, passes loosely through a hole formed for its reception in member 168 and assists in holding said member in horizontal position. At a point 168' approximately midway between its ends, member 169 is bent outwardly and then back so as to again parallel the front wall of the case. This portion has a depth from top to bottom, substantially equal to the length of coin slot 135. This portion is provided with a cam surface 171, and between said cam surface and gate 167, is provided with a vertically extending slot 172. This slot is located immediately behind coin slot 135 and is provided for the purpose of receiving portion 173 of a coin slot guard or shutter 174. This guard or shutter is mounted to swing freely about the shank of a pivot screw 175 which is threaded into a hole in the side wall of the case adjacent coin slot 135 (Figs. 2, 3, 16 and 17).

Figure 16:
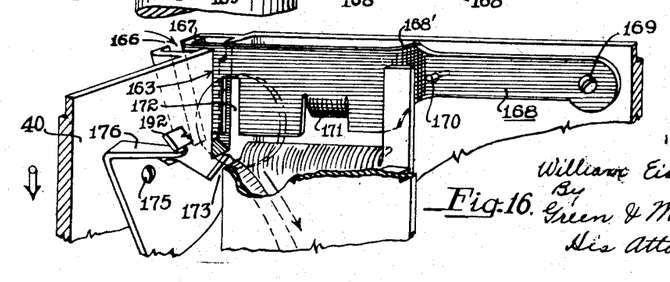
Fig. 16 is an enlarged perspective view of the outer coin slot gate and the inner coin slot guard and shows both open.
Figure 27:
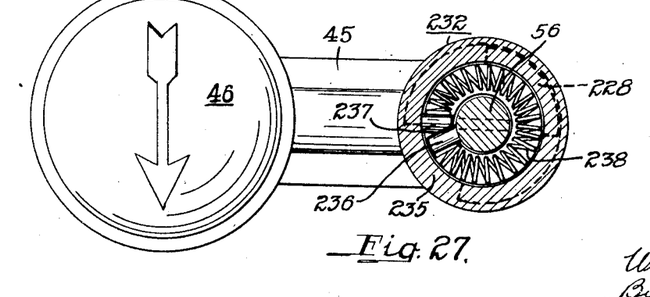

Guard or shutter 174 adjacent its pivotal mounting screw 175 is provided with a laterally extending arm 176, and is so designed and so mounted that gravity normally causes it to assume its open position as shown in Fig. 16, and by dotted lines in Fig. 17.

A plate-like lever arm 177, which at one end loosely surrounds reduced end portion 178 of the main shaft 53, at its other end carries a pin-like member 179. Lever 177 is normally held in horizontal position and in contact with the top 180 of release lever stop 133 (Fig. 11) by means of a spring 181.

Reduced end 178 of the main shaft has a pin 182 projecting radially therefrom and lever 177 carries an outwardly projecting pin 183 with which pin 182 contacts during counterclockwise movement of main shaft 53. This occurs as the signal arm, while being manually operated, approaches the limit of its counter-clockwise or downward movement.

Movement of lever 177 from its normal position (Fig. 11) to the position shown in Fig. 12, causes its pin 179 to contact cam surface 171 and move or spring member 168 from the position shown in Fig. 2 to the position shown in Fig. 3, thus opening the outer coin slot. Figs. 3 and 16 show the position of the parts when the signal arm reaches the limit of its counter-clockwise movement.

Lever 177 carries a member 184, and this member at its outer end has a laterally projecting foot 185. Indicator hand 78, which is rigidly attached to timing cam shaft 77, is provided with an arm 186. When pointer 78 reaches the end of its upward travel, during operation of the clock, after paid for parking time has expired (Fig. 11) the upper end of arm 186 is in position to be contacted by foot 185 as lever 177 is moved by pin 183. The construction and arrangement of these parts is such that as pin 179 moves member 168 to open the coin slot, pointer or hand 78 is moved to zero position (indicated by dotted lines in Fig. 11) which corresponds to starting position for timing cam 60.

A lever 189 mounted for pivotal movement on a stub shaft 190 carried by a bracket member 191, has its upper end 192 bent so as to lie above and contact with arm 176 of guard 174. A second lever 193 also pivotally mounted on stub shaft 190 is connected to lever 189 by a spring 194. This spring yieldingly pulls said levers together, or in other words, tends to prevent their separation.

Lever 193 has a pin 195 projecting laterally therefrom, and this pin, when lever 193 swings in a clockwise direction, moves lever 189 with it. A spring 196 coiled about stub shaft 190 tends to cause lever 193, and lever 189, because of pin 195, to move in a clockwise direction. The free end of lever 193 is provided with an arcuate slot 197 having an offset 198. A pin 199 carried by arm 110 of actuator 65, when said actuator is moved to starting position (Figs. 9, 10, and 11) is positioned within offset 198 and therefore in line with wall 200 of said offset which in effect constitutes a shoulder.

As soon as a coin is deposited, the release mechanism unlocks the release lever. This permits said lever to swing away from stop 133 and releases the actuator. The actuator, through the agency of pin 199 acting against wall 200 gives to lever 193 a quick movement or kick in a clockwise direction about shaft 190. As the actuator and lever 193 swing in a clockwise direction, the outer end of lever 193 rises. This movement is shown by arrows in Fig. 12 and pin 199 in effect moves to the bottom of slot 198 and in line with slot 197.

Movement of lever 193 sufficient to cause lever 189 to move guard or shutter 174 to closed position, as indicated in Figs. 5 and 17, occurs when lever 193 swings from its position in Fig. 11 to its position in Fig. 12.

When a nickel or five cent piece is deposited, pin 199 in contact with wall 200 gives lever 193 a quick movement or kick, after which spring 196 swings it in a clockwise direction about its pivot shaft, and pin 199, when free of wall 200 moves along slot 197 to the position indicated in Fig. 14. It will be seen that the movement of lever 193 is the same whether a penny or nickel is deposited.

When a coin is deposited, shutter 174 moves to position to close the coin slot, and remains in this position until the actuator is moved back to starting position by cam 64. This movement of the actuator occurs just prior to the time the signal arm, during its clockwise movement reaches its horizontal position. Shortly after the signal arm begins its clockwise movement from its lowest position to its horizontal position, lever 177 is pulled down to normal position by its spring 181, and its pin 179, moving below and out of contact with cam surface 171 of member 168, allows the outer end of said member to spring back into normal position.

*The clock mechanism and means for starting and stopping the same*

As above pointed out, only so much of the clock mechanism is illustrated as is necessary for a complete understanding of the other mechanisms entering into the make-up of the meter of this invention.

Coil spring 76 which operates the clock mechanism, has one end anchored to back plate 51 as shown at 201. This spring passes over a pulley 202 and has its opposite end 203 secured to one end of a lever 204. This lever is secured to an overrunning clutch or ratchet (not shown) associated with gear 205 which meshes with one of the pinions of the clock train. The opposite end 206 of lever 204 lies in the path of travel of a roller 207 carried at the outer end of arm 73a which is rigidly secured to shaft 73 of mutilated gear 72. Each time the signal arm is moved to open the coin gate, clock spring 76 is fully stressed.

The clock mechanism, which is of more or less standard form as used in modern striking clocks, alarm clocks and certain types of taximeters, is under control of a standard form of escapement mechanism and includes a balance wheel 208.

Shaft 73 which extends through support plate 51, at its rear end carries a cam 209. Pivoted to support plate 51 by means of a pivot screw 210 is a lever 211, and pivotally connected to lever 211 by pivot screw 212 is a lever 213. Stub shaft 81, which is rigidly connected to timing cam shaft 77, in line with lever 211 is provided with a cam 214.

The upper end of lever 210 is provided with an arm 215 which projects toward cam 214, and a spring 216 forces said arm toward said cam. A spring 217 has its upper end secured to lever 211, and its lower end secured to lever 213.

Lever 211 carries a pin 218 and lever 213 is provided with a slot 219 within which said pin is positioned when levers 211 and 213 are in normal position, as shown in Fig. 6. This view illustrates the position of these levers when the meter is at rest and the clock mechanism is stopped.

Lever 213 at its lower end carries a flexible or spring pin 220 which contacts with the periphery of the balance wheel 208 to stop the clock mechanism, when indicator hand 78 has been moved by the clock mechanism to the limit of the overtime period (Fig. 6).

Lever 213 at its upper end carries a pin 221. A latch lever 222 pivotally mounted on support plate 51 by means of a pivot screw 223, is provided with a laterally extending cam contact plate 224 adjacent its inner end, and has serrations 225 in its under face adjacent its outer end. The construction and arrangement of these parts is such that when the signal arm is being moved counter-clockwise from violation position to the limit of its travel, cam 209, just before the limit of such travel is reached, swings the upper end of lever 213 toward cam 214. At this point, the lower arm of lever 213 contacts with a stop 226, and, as the upper end of lever 213 moves nearer cam 214, the hooked end 215 of lever 210 is moved away from cam 214 so that said cam is free to be moved by the timing cam shaft as the timing cam is moved to starting position. In Fig. 8, cam 214 is in the position corresponding to the starting position of the timing cam for a 12 minute parking period.

Movement of the upper hooked end 215 of lever 211 away from cam 214 takes place when the upper arm of lever 213 is moved toward cam 214, with its lower arm in contact with stop 226, since the lower arms of levers 211 and 213 are pivotally connected together below pivot screw 210.

Since latch lever 222 rests on pin 221 during the time cam 209 is moving the upper arm of lever 213 toward cam 214, latch lever 222 locks lever 213 in the position shown in Fig. 7. When lever 213 is in the position shown in Fig. 6, the balance wheel starting pin 220 is in contact with the balance wheel. This is also true when lever 213 has been moved about stop 226 as a fulcrum to the position shown in Fig. 7.

As the signal arm during its clockwise movement, approaches horizontal position, cam 209 raises latch 222 out of engagement with pin 221 and permits spring 217 to snap lever 213 to the position shown in Fig. 8. This snaps the balance wheel into action and starts the clock mechanism.

Upon expiration of the overtime period, cam 214 has moved to the position shown in Fig. 6. This allows the upper hooked end of lever 211 to be moved by spring 216 over cam 214. During this movement, pin 218 carries the lower end of lever 213 toward stop 226, and flexible pin 220 contacts with the periphery of the balance wheel and stops the clock mechanism.

*Signal arm*

Projecting forwardly from the front wall of the meter case, and preferably formed as a unitary part thereof, is a hollow cylindrical boss 227 which is provided with an outwardly extending arcuate stop member 228.

Stub shaft 56, having tongue 55 for connection with groove 54 in the outer end of main shaft 53 of the meter, is adapted to be journaled within the bore 229 of hollow boss 227. To the outer end of stub shaft 56 a disk 230 is rigidly secured and the stub shaft, adjacent its inner end (that end carrying tongue 55) is provided with a circumferential groove 231.

Signal arm 45, which at one end carries signal 46, at its other end has a hollow cylindrical boss 232 formed as a unitary part thereof. This boss is provided with bores of two diameters; the smaller diameter bore 233 is adapted to make a snug, but movable fit with that portion of the outer cylindrical surface of boss 227 located forwardly of stop member 228. The outer or larger bore 234 is adapted to make a snug but movable fit with the outer peripheral surface of stop member 228.

This outer bore in fact is only partial as shown in Fig. 28 and extends only from one side to the other of a portion 235 which forms a stop for cooperating with stop member 228.

Stub shaft 56 is provided with an outwardly projecting pin 236 and hollow cylindrical boss 232 is provided with an inwardly projecting pin 237. A coil spring 238, which is located within inner bore 233 and surrounds stub shaft 56, has one of its ends bearing against pin 236 and its other end bearing against pin 237.

The outer end wall of hollow boss 237, as shown at 239, is concaved, and, when hollow boss 232 of the signal arm is mounted in position within boss 227 with its stop 235 in line with stop 228, the curved end of boss 227 confines spring 238 in place.

Circumferential groove 231 of stub shaft 56, when the signal arm assembly is mounted in position, is located just behind the rear face of the front wall of the meter case, and the signal arm assembly is locked in position by means of a locking plate 240, which extends into said groove and is secured in position by means of screws, as shown in Fig. 29.

When the signal arm is in vertical position with signal 46 displayed above the meter case, end 241 of stop 235 contacts with end 242 of stop 228, and when the signal arm reaches the lower limit of its travel, end 243 of stop 235 contacts with end 244 of stop 228.

The arrangement of pins 236 and 237 and spring 238 is such, that during manual counterclockwise movement of the signal arm, stub shaft 56 is positively and unyieldingly moved by said arm, but during clockwise movement of stub shaft 56 under the urge of spring 63 (the spring attached to segment gear 62) the signal arm because of spring 238, is only yieldingly moved.

Experience in the operation of these parking meters has shown that attempts are made during the paid for parking time privilege to force the signal arm from its horizontal position to violation position. In some cases, breakage of the signal arm has resulted, and, in an attempt to cure this difficulty and save the signal arm, this construction has been adopted. This permits the signal arm to be moved from its horizontal position to violation position, but as soon as released, the arm, under the action of spring 238 is immediately returned to its horizontal position.

Having thus described my invention, what I claim as new and desire to secure by Letters Patent is:

1. In a parking meter, a housing having a coin slot, a lever arm mounted for manual swinging movement about a horizontal axis and which at its outer end is provided with a parking violation indicator, spring means tending to hold said arm in vertical position with said indicator conspicuously displayed above the meter housing, a guard normally closing said coin slot, means between said guard and said lever arm for moving said guard to open said coin slot when said lever arm is manually swung to a position below horizontal, coin controlled clock operated mechanism including a timing cam for retaining said lever arm in horizontal position during the parking period, and means cooperating with said cam for releasing the lever arm and allowing it to be moved to normal position by said spring means upon expiration of the parking period.

2. In a parking meter having a clock operated parking time indicator, a coin slot, coin controlled mechanism for determining the parking period, a coin slot guard, a manually operable lever arm for stressing the clock spring, means operating during the clock spring stressing movement of said lever arm for moving the coin slot guard to open the coin slot and means for blocking the coin slot upon operation of said coin-controlled mechanism and unblocking said slot upon closing of said guard.

3. In a parking meter, a parking period indicator, coin-controlled means for moving said indicator in one direction to starting position, a spring operated clock for moving said indicator in the opposite direction, a meter housing having a coin slot and a window through which said indicator is visible, a parking violation indicator, means manually movable in one direction carrying said violation indicator and utilized to stress the clock spring, clock operated means which is also moved to starting position by said coin-controlled means and holds said manually movable means in such position during the parking period that said violation indicator is held below the top of the meter housing and for releasing said manually movable means at the expiration of the parking period, and means for moving said manually movable means to a position where said violation indicator is displayed above the top of the meter housing when so released.

4. In a parking meter, a parking period indicator, coin-controlled means for moving said indicator in one direction to starting position, a spring operated clock for moving said indicator in the opposite direction, a meter housing having a coin slot and a window through which said indicator is visible, a lever arm which is manually operable in one direction for stressing the clock spring, and which carries a parking violation indicator, clock operated means which is also moved to starting position by said coin-controlled means for holding said lever arm with said violation indicator below the top of the meter housing during a parking period, and a spring for moving said lever arm to a position where said violation indicator is displayed above the top of the meter housing when said lever arm is released by said clock operated means.

5. In a parking meter, a meter housing having a coin slot, a parking period indicator, coin-controlled means for moving said indicator in one direction to starting position, a spring operated clock for moving said indicator in the opposite direction, manually operated means for stressing the clock spring, means normally closing said coin slot and which is moved to uncover said coin slot during stressing of the clock spring, and means for blocking the coin slot upon operation of said coin-controlled means and unblocking said slot upon closing of the same by said coin slot closing means.

6. In a parking meter, a parking period indicator, coin-controlled means for moving said indicator in one direction to starting portion, a spring operated clock for moving said indicator in the opposite direction, a meter housing having a coin slot, a parking violation indicator, means carrying said violation indicator and manually movable in one direction for stressing the clock spring, clock operated means which is also moved to starting position by said coin-controlled means, and holds said manually operated means in such position during the parking period that said violation indicator is held below the top of the meter housing and for releasing the same at the expiration of said period, means for moving said manually operated means, when released, to a position where said violation indicator is displayed above the top of the meter housing, means normally closing said coin slot and which is moved to open said slot during stressing of the clock spring, and means for blocking the coin slot upon operation of said coin-controlled means and unblocking said slot upon closing of the same by said coin slot closing means.

7. In a parking meter, a meter housing, a shaft carrying a parking period indicator and a timing cam, coin controlled means for rotating said shaft in a direction to place said indicator and cam in starting position, spring operated clock mechanism for rotating said shaft in the opposite direction, a horizontal shaft, a lever arm carrying a violation indicator, having operative connection with said horizontal shaft and being manually rotatable in one direction to stress the spring of said clock mechanism, spring means for rotating said horizontal shaft in the opposite direction, means for stopping such spring occasioned rotation when said violation indicator is conspicuously displayed above the top of the meter housing, and means co-operating with said timing cam upon the operation of said coin controlled means to hold said lever arm in horizontal position, after being manually moved to a position below horizontal.

8. In a parking meter, meter mechanism comprising a coin controlled spring operated clock mechanism and a timing cam operated by said clock mechanism, a housing provided with a coin slot, a horizontal shaft, a lever arm having connection with said horizontal shaft, carrying a violation indicator adjacent its outer end and being manually rotatable in one direction to stress the spring of said clock mechanism, means for rotating said shaft in the opposite direction until said lever arm is above said shaft and said violation indicator is conspicuously displayed above the top of the meter housing, means operated during manual movement of said lever arm from normal position to a position below normal for placing the meter mechanism in condition to move the timing cam to starting position when a coin is deposited within said coin slot and means co-operating with said timing cam and operated when a coin is deposited within said coin slot for holding said lever arm, during a paid-for parking time period, in a position in which said violation indicator is below the top of said housing.

9. In a parking meter having a spring operated clock mechanism, a meter housing, a horizontal shaft, a lever arm operatively connected to said horizontal shaft and having at its outer end a violation indicator which is conspicuously displayed in violation position above the top of the meter housing when in normal position above said shaft, means operated by manual movement of said lever arm from normal position to a position below horizontal for stressing the spring of the clock mechanism, means operated by said clock mechanism and including a shaft carrying a parking period indicator and a timing cam, coin controlled means for moving said shaft to locate said parking period indicator and timing cam in starting position, means co-operating with said timing cam for holding said horizontal shaft, lever arm and violation indicator in non-violation position during a parking time period and for releasing said horizontal shaft, said lever arm and violation indicator at the expiration of such period, and spring means for moving the same to violation position at the expiration of such parking time period.

10. In a parking meter, a meter mechanism comprising a coin controlled spring operated clock mechanism and a rotatable shaft carrying a parking period indicator and a timing cam operated by said clock mechanism, a housing for said mechanism provided with a coin slot, a horizontal shaft, a lever arm operatively connected to said horizontal shaft mounted within said housing and having at its outer end a violation indicator, spring means tending to so rotate said shaft that said violation indicator is normally positioned above the top of the meter housing, means operated by the manual movement of said lever arm in opposition to said spring means for stressing the spring of said clock mechanism and setting the meter mechanism in condition to operate when a coin is deposited within the coin slot, and means co-operating with said timing cam for so holding said lever arm that said violation indicator is positioned below the top of the meter housing during a paid-for parking time period.

11. A structure according to claim 10 in which the housing for the meter mechanism is provided with a window through which the parking period indicator is visible.

12. A structure according to claim 7, in which the lever arm carrying the violation indicator is operatively connected to the horizontal shaft by means of a device which permits lost motion between such lever arm and shaft and employs a spring for normally taking up such lost motion.

13. In a parking meter, a meter housing having a coin slot and a window, a parking period indicator visible through said window, spring operated clock mechanism for moving said indicator from starting position, coin controlled means for moving said indicator to starting position, means including a manually operable lever arm for stressing the spring of the clock mechanism, a guard normally closing said coin slot, means operated during spring stressing operation of said lever arm for moving said guard to uncover said coin slot and means operated upon deposition of a coin within said coin slot to block said coin slot until the same is again closed by said guard.

14. In a parking meter, a meter housing having a window, a parking period indicator visible through said window, a timing cam movable with said indicator, a spring operated clock mechanism for moving said indicator from starting position, coin controlled means for determining the starting position of said indicator and for moving the same to such position, a lever arm mounted for swinging movement about a horizontal axis and carrying a violation indicator which when said arm is in normal position is displayed above the top of the meter housing, means operated by manual movement of said lever arm from normal position for stressing the spring of said clock mechanism, and means cooperating with said timing cam for holding said lever arm, during a parking time period, in non-violation position below the top of the meter housing.

15. In a parking meter, a shaft carrying a parking period indicator and a timing cam, a spring operated clock mechanism for turning said shaft in one direction, a manually operable lever for stressing the spring of said clock mechanism, means normally connecting said shaft to the clock mechanism, means operated by the movement of said lever for disconnecting the clock mechanism from said shaft during stressing of the clock spring and spring actuated coin controlled means for turning said shaft in the opposite direction to that occasioned by said clock mechanism to set said shaft with its cam and parking period indicator in starting position during the time said shaft is disconnected from the clock mechanism.

WILLIAM EISENSCHMID.